(12) United States Patent
Levenshteyn et al.

(10) Patent No.: US 9,531,817 B2
(45) Date of Patent: Dec. 27, 2016

(54) TECHNIQUE FOR PROVIDING INTEROPERABILITY BETWEEN DIFFERENT PROTOCOL DOMAINS

(75) Inventors: Roman Levenshteyn, Aachen (DE); Ioannis Fikouras, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2537 days.

(21) Appl. No.: 12/158,015

(22) PCT Filed: Dec. 19, 2005

(86) PCT No.: PCT/EP2005/013674
§ 371 (c)(1),
(2), (4) Date: Oct. 28, 2008

(87) PCT Pub. No.: WO2007/071269
PCT Pub. Date: Jun. 28, 2007

(65) Prior Publication Data
US 2009/0093237 A1    Apr. 9, 2009

(51) Int. Cl.
*G06F 15/16*    (2006.01)
*H04L 29/08*    (2006.01)
*H04L 29/06*    (2006.01)

(52) U.S. Cl.
CPC .............. *H04L 67/16* (2013.01); *H04L 65/104* (2013.01); *H04L 65/1016* (2013.01); *H04L 67/02* (2013.01); *H04L 69/08* (2013.01)

(58) Field of Classification Search
CPC ............................... H04L 65/104; H04L 67/16
USPC ......................................... 709/227, 230, 246
See application file for complete search history.

(56) References Cited

U.S. PATENT DOCUMENTS

| | | | |
|---|---|---|---|
| 6,988,143 B2* | 1/2006 | O'Neill et al. | 709/230 |
| 7,124,413 B1* | 10/2006 | Klemm et al. | 719/313 |
| 7,983,240 B2* | 7/2011 | Jansson et al. | 370/351 |
| 2003/0191970 A1* | 10/2003 | Devine et al. | 713/201 |
| 2004/0121775 A1* | 6/2004 | Ropolyi et al. | 455/445 |
| 2004/0148416 A1 | 7/2004 | Aaronos et al. | |
| 2006/0206504 A1* | 9/2006 | Cai et al. | 707/100 |
| 2006/0268835 A1* | 11/2006 | Hyotylainen et al. | 370/352 |
| 2006/0291489 A1* | 12/2006 | Naqvi et al. | 370/401 |

(Continued)

OTHER PUBLICATIONS

Magedanz T et al: "The IMS Playground @ Fokus—An Open Testbed for Next Generation Network Multimedia Services" Testbeds and Research Infrastructures for the Development of Networks and Communities, 2005. Tridentcom 2004. First International Converence on Trento, Italy Feb. 23-25, 2005, Piscataway, NJ. USA. IEEE Feb. 23, 2005.

(Continued)

*Primary Examiner* — Emmanuel L Moise
*Assistant Examiner* — Marie Georges Henry

(57) ABSTRACT

The disclosure relates to a technique for providing interoperability between an Internet protocol multimedia subsystem (IMS) domain and a non-IMS domain. A method implementation of this technique comprises the steps of receiving on a service layer a service invocation message from a non-IMS domain, analyzing the message to identify the message as a request to invoke a service within the IMS domain, converting non-IMS session control protocol elements contained in the message into IMS session control related protocol elements, and generating an outgoing IMS message to establish an IMS control session.

23 Claims, 4 Drawing Sheets

(56) References Cited

U.S. PATENT DOCUMENTS

2007/0121608 A1* 5/2007 Gu et al. .................. 370/356
2011/0004690 A1* 1/2011 Georgel et al. ........... 709/227

OTHER PUBLICATIONS

"Universal Mobile Telecommunications System (UMTS); Open Service Access (OSA): Stage 2 (3GPP TS 23.198 version 6.0.0 Release 6); ETSI TS 123 198" ETSI Standards, European Telecommunications Standards Institute, Sophia-Antipo, FR, vol. 3-CT5, No. V600. Mar. 2005.
Anonymous: "Open Service Access (OSA); Mapping of Parlay X Web Services to Parlay/ OSA APIs; Part 14: Presence Mapping; Sub-part 2: Mapping to SIP/IMS Networks: ETSI TR 102 397-14-2" ETSI Standards, European Telecommunications Standards Institute, Sophia-Antipo, FR, vol. TISPAN, No. V111, Aug. 2005.
Ejzak R P et al: "Flexent IMS—The Convergence of Circuit and Packet Core Networks" Bell Labs Technology, Bell Laboratories, Murrey Hill, NJ, US, vol. 2. No. 7, 2002.
Charter for OASIS Web Services Composite Application Framework (WS-CAF) TC, Mar. 10, 2005.
Rosenberg, J., RFC 3261 SIP: Session Initiation Protocol, Jun. 2002, available at http://www.ietf.org/rfc/rfc3261.txt#.

* cited by examiner

TECHNIQUE FOR PROVIDING INTEROPERABILITY BETWEEN DIFFERENT PROTOCOL DOMAINS

FIELD OF THE INVENTION

The present invention relates to a technique for providing interoperability between different protocol domains. The technique is particularly adapted for use in connection with the Internet protocol multimedia subsystem (IMS) domain. In this regard, the present invention is designed to provide interoperability with an IMS session control protocol.

BACKGROUND OF THE INVENTION

The IMS is a standardised next generation network (NGN) architecture for network operators providing mobile and fixed multi-media services. It uses a $3^{rd}$ Generation Partnership Project (3GPP) standardised implementation of SIP and runs over the standard Internet protocol (IP). Existing telephone systems (both packet-switched and circuit-switched) are supported also. IMS uses open standard IP protocols as defined by the Internet Engineering Task Force (IETF). In this way, a multimedia session for example between two IMS users, between an IMS user and a user on the Internet, or between two users on the Internet can be established using exactly the same protocols. IMS merges the Internet and the cellular worlds by using cellular technologies to provide ubiquitous access and Internet technologies to provide appealing services.

The IMS comprises three main components: the serving call session control function (S-CSCF) on a control layer, and the home subscriber server (HSS) as well as a session initiation protocol (SIP) application server (AS) on an application layer.

The SIP protocol is a core control technology of IMS. It is used for controlling multimedia sessions combining for example voice and data streams. Essentially, SIP is a text-based protocol for communication sessions between parties. In particular, SIP is used for the establishment, control and finalization of communication sessions between network-based applications and also for the control of media channels between those applications. After a session is established, other protocols can be used for communication between applications. Thus, the major functions of SIP are session control, addressing and mobility management on service level.

IMS provides a lot of common functions used by mobile networks, such as AAA (authentication, authorization, and accounting), charging, access control, and HSS (i.e. user profile databases). These functions of IMS are meant to be used by the converged applications in a uniform way, so that there is no need to have separate mechanisms applied for example to voice and to data communications.

In parallel to the IMS domain, the extensible Markup Language (XML) Web Services (WS) concept has been developed. XML WS are a relatively new technology for the creation of distributed, highly interoperable systems. XML WS are based on XML-based standards, like Simple Object Access Protocol (SOAP), Web Service Definition Language (WSDL) and Universal Description, Discovery and Integration (UDDI). Web Services are cross-platform interoperable, and programming language independent. They have become a popular means of development and system integration of enterprise systems and network applications. Due to their flexibility and a design that is more aligned with IT networks, Web Services based architectures, e.g. Service Oriented Architectures (SOAs), are emerging quickly and are likely to be adopted in mobile communication network design.

Most Web Services are stateless, which means that each invocation of the Web Service should contain all the information it needs to process a request, since the processing depends only on this data. This design greatly simplifies implementation of WS. Recently, however, many researchers and practitioners in the WS area have realized that there is also a need for stateful Web Services. Such stateful services are particularly important for transactions involving several service invocations. They are equally important where a correlation between messages is required, e.g. electronic banking, and booking of tickets. Several WS specifications that address these issues, e.g. WS-Context, WS-Addressing and WS-Resource Framework, have been submitted to standardization, but most of these simply complement WS SOAP invocation headers through session information headers.

The IMS architecture defines that all incoming service invocations be carried out over SIP sessions. The IMS nodes, e.g. CSCF-I and the CSCF-P, are SIP servers that handle incoming SIP messages. However, even today many non-SIP based services exist in the operator domain and these services often use non-SIP protocols and technologies (e.g. Web Services, but also J2EE, NET, etc.).

Providing access for external users to services, in particular non-SIP services, in the IMS domain is generally not possible because external third-party non-SIP service consumer applications are typically unaware of the fact that the invoked service is located inside the IMS domain, and such external consumer applications typically do not support SIP. Hence, a non-SIP service consumer is unable to access the service in question inside the IMS domain, which greatly reduces the availability and therefore the value of the service.

SIP and WS address similar problems, but each has its own solutions to session management. In other words, the approaches used for session management by SIP and WS are independent from each other. As a result, Web Services deployed inside the IMS domain require their own IMS-incompatible WS infrastructure, including authentication, accounting, charging and other IMS functionality. Further, WS invocations are executed based on URLs (unique resource locators) that require a precise knowledge of the service's current network address (e.g. IP number, DNS name, etc.). This means that users cannot invoke services hosted on mobile platforms (e.g. mobile terminals, and network nodes that regularly change their URL) until their current URL is known.

However, Web Service SOAP invocation headers are complemented through session information headers. This can lead to large SOAP messages compared to the size of the payload. Such headers are sent with each SOAP message and thus consume more bandwidth than session-less Web Services. Increased traffic can be a special issue in the over-the-air mobile environments, where it could introduce a higher network load and lead to bigger latencies. While compression schemes to compress and decompress SOAP messages may be employed to address this issue, these have been shown to be very resource intensive and time consuming, even with high-end mobile terminals.

Accordingly, there is a need for a technique for providing increased interoperability between services located within the IMS domain and client components situated outside the IMS domain.

SUMMARY OF THE INVENTION

According to one aspect, the present invention provides a method of providing interoperability between an Internet protocol multimedia subsystem (IMS) domain and a non-IMS domain, wherein the method comprises the steps of receiving on a service layer a service invocation message from a non-IMS domain, analyzing the message to identify the message as a request to invoke a service within the IMS domain, converting on a session control layer non-IMS session control protocol elements related to the message into IMS session control related protocol elements, and sending one or more messages towards the IMS domain to provide an IMS control session in the IMS domain based on the IMS session control related protocol elements.

In one example, the conversion step may be based on a mapping scheme that associates individual non-IMS session control protocol elements with individual IMS session control related protocol elements. Protocol elements include protocol-specific message types (such as service invocation messages), message portions (such as headers), and message fields (such as header fields specifying particular addresses).

The method may also include the step of forwarding on the service layer the service invocation message using the IMS control session. The method may further include the steps of receiving at least one further message from the non-IMS domain related to the invoked service within the IMS domain, and forwarding on the service layer the service message using the IMS control session. A mapping scheme may also be used here to associate a particular service requestor (e.g. an application or a network component outside the IMS domain) with one or more requested (and/or ongoing) sessions inside the IMS domain.

The method of the invention may further include the steps of receiving a message from the IMS domain during the session, converting IMS session control related protocol elements related to the message from the IMS domain into non-IMS session control protocol elements, generating a non-IMS message based on the non-IMS session control protocol elements, and sending the non-IMS message during the session towards the non-IMS domain.

In one variation of the invention, the service within the IMS domain is an IMS protocol based service. For example, the service in the IMS domain could be an IMS support function that may include one or more of the following functions: authentication, authorization, accounting (e.g. AAA), charging, access control, and HSS. Here, the IMS session control protocol may be the DIAMETER protocol that provides for example accounting information for the service. The service itself may be provided from within or from outside the IMS domain.

In another variation, the service in the IMS domain is a non-IMS protocol-based application (e.g. a programmatically accessible service such as a Web Services based application operated from within the IMS domain). Here, the IMS session control protocol may be SIP that controls the provision (e.g. establishment and/or general management) of the IMS service session.

The non-IMS session control protocol elements preferably comprise headers of a non-IMS session control protocol, and the IMS session control related protocol elements preferably comprise headers such as SIP headers. By way of example, the non-IMS protocol based service may employ a Markup Language (ML) based messaging protocol, such as XML Web Services.

Preferably, the method further includes the steps of analyzing the message received from the non-IMS domain and/or from the IMS domain, determining a state of the session with the service in the IMS domain based on the analyzed message, and storing the state of the session. Storing the state of a particular session facilitates the mapping between individual services within the IMS domain and the individual sessions (that potentially stretch into the non-IMS domain).

According to a further aspect, it may be checked (e.g. in response to receipt of a message from the non-IMS domain) whether a session with a service in the IMS domain is ongoing, and, if there is no ongoing session, a new session may be established under an IMS session control protocol such as SIP.

Preferably, non-IMS messages are authenticated prior to establishing the control session in the IMS domain. Authentication may be performed by analyzing an address specified in a non-IMS message.

In one variation, the method further includes the steps of employing a uniform addressing scheme using SIP addressing for the invocation of fixed and/or mobile services. In this way, when the service to be invoked resides on a mobile platform inside the IMS domain, the method may further comprise the step of defining a SIP unique resource identifier (URI) for dynamic invocation of the service in the IMS domain, regardless of a current unique resource locator (URL) for the mobile platform.

Thus, a further concept which may operate independently of the above described protocol element conversion is a method of addressing and invoking fixed and mobile services using a uniform addressing scheme by means of SIP addressing, comprising the steps of defining use of a SIP URI for dynamic invocation of mobile services regardless of their current URL (e.g. by defining an extension for WS-Addressing) and/or defining the fixed addressing of services using a SIP URL. Instead of SIP, other IMS session control protocols could be used as well for addressing and identifying purposes.

According to another aspect, the present invention provides a computer program product comprising program code portions for performing the steps of the method is when the computer program product is run on one or more computers or computer systems. The computer program product may be stored on a computer readable recording medium.

According to a further aspect, the present invention provides a computer processor and a memory coupled to the processor, wherein the memory is encoded with one or more programs that may perform steps for providing interoperability between an IMS domain and a non-IMS domain according to method of the invention described above.

According to a still further aspect of the invention, there is provided a mapping device for providing interoperability between an Internet protocol multimedia subsystem (IMS) domain and a non-IMS domain, the mapping device comprising an analyzing unit to analyze incoming service invocation messages received on a service layer from the non-IMS domain, to identify whether one of the service invocation messages is an invocation of a service within the IMS domain, a conversion unit to convert on a session control layer non-IMS session control protocol elements related to the one of the messages into IMS session control related protocol elements, and a messaging unit to generate one ore more message to provide an IMS control session in the IMS domain based on the IMS session control related protocol elements.

The mapping device of the invention may be implemented as a gateway between the IMS domain and the non-IMS domain. Alternatively, the mapping device may be integrated in a protocol stack of a network component in the non-IMS domain. Other implementations may be used as well.

BRIEF DESCRIPTION OF THE DRAWINGS

Particular embodiments of the present invention will now be described with reference to the accompanying drawings, in which like reference numerals identify like features, and in which.

DETAILED DESCRIPTION OF THE INVENTION

In the following description, for purposes of explanation and not limitation, specific details are set forth, such as particular sequences of steps, protocol standards and various configurations of devices in order to provide a thorough understanding of the present invention. It will be understood that the present invention may be practiced in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC).

Figure 1:
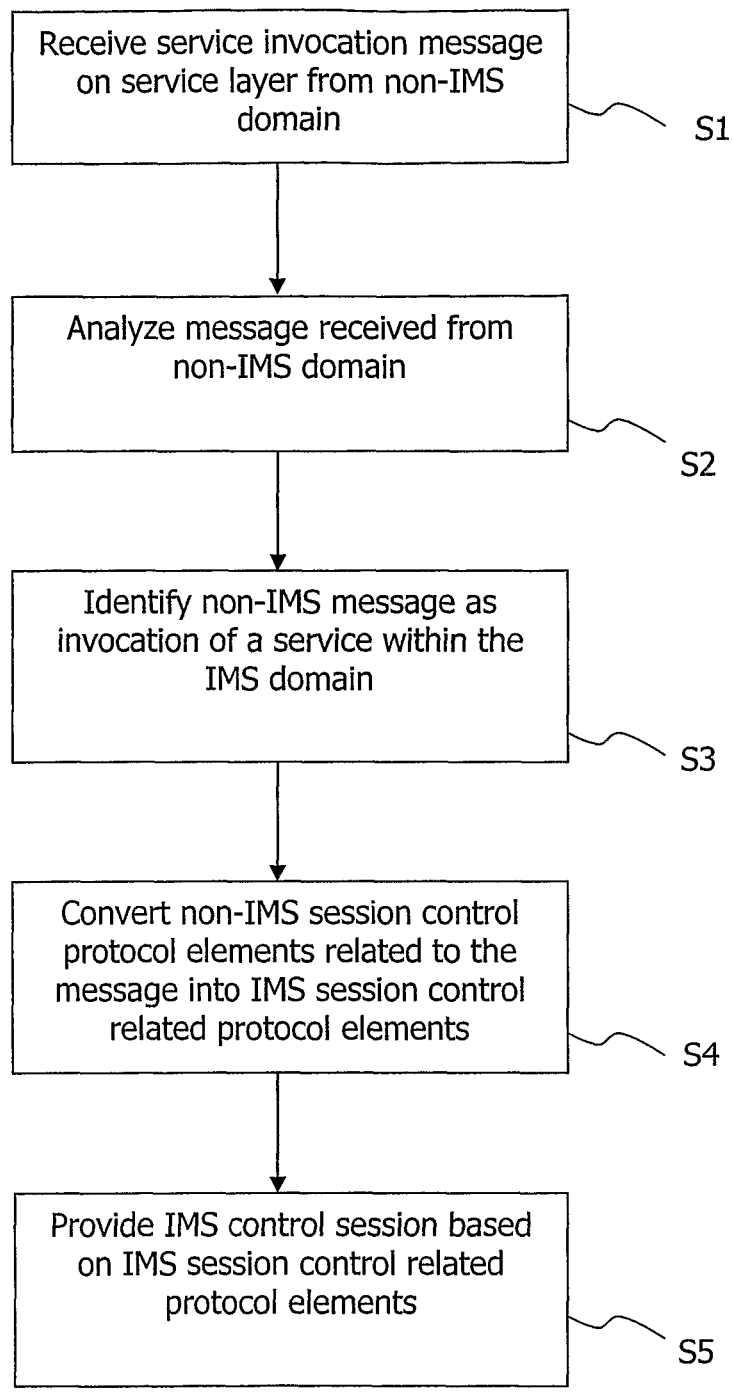
FIG. 1 is a schematic flowchart illustrating a method embodiment according to the present invention.

The technique for providing interoperability between different protocol domains according the present invention will firstly be described with reference to FIGS. 1 and 2. FIG. 1 schematically illustrates a method embodiment for providing interoperability between an IMS domain and a non IMS domain. Correspondingly, FIG. 2 schematically illustrates an embodiment of a mapping device 100, which operates to provide this interoperability between the IMS domain and the non-IMS domain.

Figure 2:
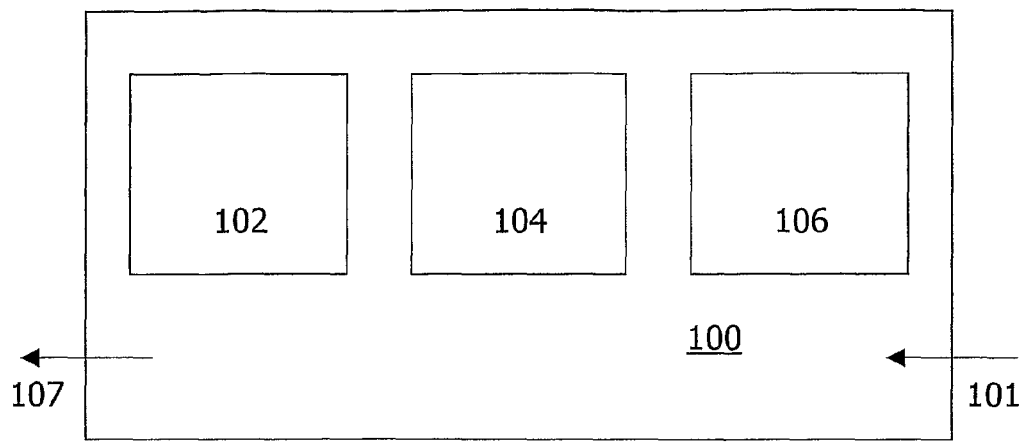
FIG. 2 is a schematic illustration of a mapping device embodiment according to the present invention operating to convert messages received from the non-IMS domain.

With reference to both of FIGS. 1 and 2, the first step S1 of the method involves receiving on a service (or application) layer a service invocation message 101 from the non-IMS domain. This message 101 is received by the mapping device 100. The second step S2 of the method involves analyzing the message received from the non-IMS domain. In other words, the message 101 received by the mapping device 100 undergoes analysis in an analyzing unit 102 of the mapping device. The third step S3 involves identifying the service invocation message received from the non-IMS domain as a request to invoke a service within the IMS domain (compared, for example, to a service that is to be provided from outside the IMS domain) This service may, for example, be an IMS support function, such as AAA or HSS, or a non-IMS service provided from inside the IMS domain. The step of identifying the nature of the message 101 received by the mapping device 100 is typically carried out by the analyzing unit 102.

After the message 101 received from the non-IMS domain has been identified as an invocation of a service within the IMS domain, the method includes the further step S4 of converting non-IMS session control protocol elements related to the service invocation message into IMS session control related protocol elements. In this regard, the method of the invention provides a conversion or mapping of, for example, non-IMS session control protocol headers into protocol headers of an IMS session control protocol, such as SIP. To this end, the mapping device 100 includes a conversion unit 104 to undertake this conversion of non-IMS protocol elements into IMS protocol elements.

The conversion can be supported through information contained in fields of incoming invocation messages. Such information can be gathered from: the IP-address of the sender, possibly also his DNS address, service specific fields such as the Web Service (e.g. SOAP, WS-Context) messages and authentication information in the form of credentials included in the message.

For example in the case of CORBA, the request_id and service_contexts fields can be used to derive information related to the transaction or session, whereas fields such as requesting_principal and operation can be used to derive information related to the SIP From and To fields. In general this type of information can be converted by a mapping to SIP session establishment fields such as From, To, Allow, Supported and Contact.

The method then includes the further step S5 of generating an outgoing message 107 in context with providing an IMS control session (e.g. establishing a control session or controlling an established control session) in the IMS domain based on the IMS session control related protocol elements. Establishment of the session can involve the exchange of several messages between the mapping device 100 and the service. Consequently, the mapping device may take the role of a communication partner during session establishment in the IMS domain.

Naturally, in addition to, for example, an initial message from the non-IMS domain invoking the service within the IMS domain, one or more further messages 101 may additionally be received from the non-IMS domain. In this respect, the messaging unit 106 of the mapping device 100 is adapted to generate a corresponding outgoing IMS message to control the session once it has been established.

Figure 3:
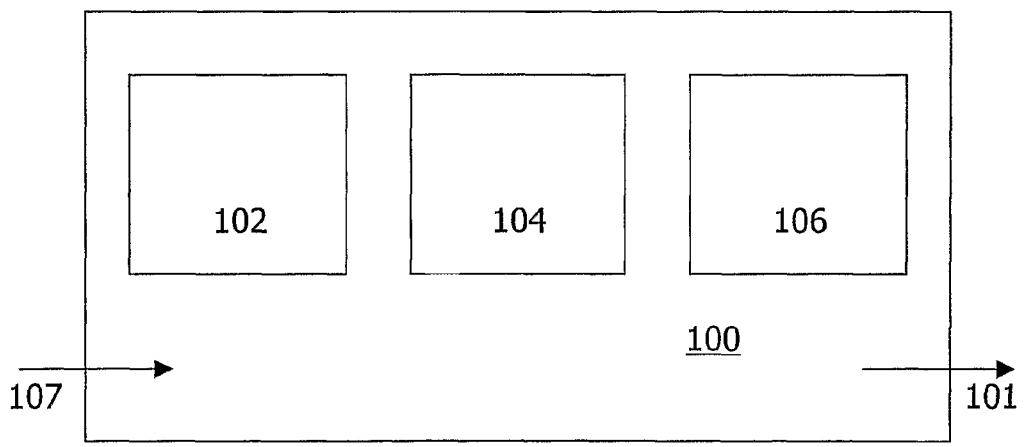
FIG. 3 is a schematic illustration of a mapping device embodiment according to the present invention operating to convert messages received from the IMS domain.

Similarly, with reference now to FIG. 3, it may also be the case that a message 107 is received from the IMS domain during the session that has been established for the invoked service. A message 107 received from the IMS domain is handled by the mapping device 100 in a reciprocal manner. Specifically, IMS session control related protocol elements, such as SIP headers, contained in that message may be converted by the conversion unit 104 into non-IMS session control protocol elements, and a corresponding non-IMS message may be generated by the messaging unit 106. The mapping device 100 then sends this non-IMS message 101 to the non-IMS domain in the course of the established session or thereafter. It will be appreciated that, in FIGS. 2 and 3, the reference numeral 101 identifies a non-IMS and the reference numeral 107 identifies an IMS message.

The following embodiments provide generic approaches for enabling interoperability between session-oriented non-SIP and SIP services. Furthermore, the embodiments also enable the provision of session functionality to non-session oriented service technologies (e.g. Web Services).

The mapping between non-SIP services and SIP sessions is accomplished by an entity (e.g. the mapping device 100 shown in FIGS. 2 and 3 or a different device) that stores the state of the particular session by parsing incoming messages (possibly in a number of different protocols). This knowledge is then used to generate appropriate outgoing messages (again possibly in a number of possible different protocols).

Non-SIP applications (from outside the IMS domain) that are not session based and invoke services deployed within the IMS domain are not aware of SIP and, therefore, are not able to establish and maintain sessions as required by IMS. For this reason, the implementation of the session mapping device takes care of initiation and management of sessions for the applications in question, as required by the session-aware part of the transaction. This may require that all messages between the invoker and the invoked service be routed through the mapping device.

To achieve this, the operator can route all incoming traffic related to publicly available IMS services via the mapping device (e.g. on the IP or higher levels). For example, services in the IMS domain could be exposed via a URL or any other addressing mechanism hosted on the mapping device. The operator may publishes this URL to external parties for addressing purposes.

For the sake of clarity, the embodiments used to illustrate the technical approach assume that the application server hosting exemplary non-SIP services within the IMS domain contains both SIP and non-SIP stacks (e.g. WS, J2EE, CORBA, etc.) appropriate to the service being invoked. Even though other possible setups may involve different protocol stacks deployed on different configurations of nodes, the general technical approach remains the same.

In the following, an embodiment of a session mapping mechanism will be described with reference to a non-SIP application A (running for example on a WS capable user terminal located outside the IMS domain) invoking a service B within the IMS domain. The non-SIP application thus acts as a client with respect to IMS service B.

Session mapping can be accomplished with the following steps:
1. Incoming requests from non-SIP applications can be authenticated based on a number of mechanisms which are described below in more detail.
2. Based on the authentication of the non-SIP application A invoking the IMS service B, the mapping device 100 checks whether it already has knowledge of an ongoing service layer transaction (corresponding to a particular session on the session control layer in the IMS domain) between non-SIP application A and IMS service B. To this end, a mapping table may be consulted that may list a plurality of previously established sessions for the non-SIP application A and/or any other non-SIP applications A'.
3. If there is no ongoing transaction between non-SIP application A and IMS service B, a new SIP session is initialized. Here, the mapping device 100 plays the role of the communication partner in the SIP session established with IMS service B.
    a. In case non-SIP application A is not session aware, the device 100 establishes a new session without taking the capabilities of non-SIP application A into further consideration.
    b. In case non-SIP application A is session aware, the device 100 will establish the new session according to the session capabilities of non-SIP application A (e.g. WS-Context, WS-Addressing Headers, etc.). The following first example illustrates the service invocation created by the WS client A using the WS-Context specification for WS session management. The second example illustrates how the mapping device 100 establishes a new SIP session with IMS service B, using the session information gathered from mapping of the SOAP message intercepted by mapping device 100. This setup implies that the service B contains both SIP and WS stacks. Other possible setups could involve different protocol stacks deployed on different nodes.

An example of an XML-based service invocation message specifying a WS-Context session is given below:

```
<soap:Envelope xmlns:soap="http://www.w3.org/2002/06/soap-envelope">
    <soap:Header>
        <context xmlns="http://docs.oasis-open.org/wscaf/2004/09/wsctx"
        timeout="100"
            xmlns:wsdl="http://schemas.xmlsoap.org/wsdl/"
            xmlns:soapbind=http://schemas.xmlsoap.org/wsdl/soap/
            soap:mustUnderstand="1">
            <context-identifier>
                http://services.operator.com/wscaf/2004/09/wsctx/abcdef:
                012345
            </context-identifier>
            <type>
                http://services.operator.com/wscaf/2004/09/
                wsctx/context/mmservice
            </type>
        </context>
    </soap:Header>
    <soap:Body>
        <!-- Application Payload -->
    </soap:Body>
</soap:Envelope>
```

The mapping device 100 converts the non-SIP elements included in the above service invocation message in a SIP session establishment message specifying session information from the WS-Context session as follows:
INVITE sips:service1@operator.com SIP/2.0
Via: SIP/2.0/TLS server.operator.com:5061; branch=z9hG4bK74bf9
Max-Forwards: 70
From: SESSION1 <sips:sipsoapgw@operator.com>; tag=1234567
To: SIPAS <sips:service1@operator.com>
Call-ID: 12345601@operator.com
CSeq: 1 INVITE
Contact: <sips:sipsoapgw@operator.com>
Allow: INVITE, ACK, CANCEL, OPTIONS, BYE, REFER, NOTIFY
Supported: replaces
Content-Type: application/sdp
Content-Length: . . .
v=0
o=servicebroker 2890844526 2890842807 IN IP4 asb.operator.com
s=Conference Service
t=0 0
m=audio 5004 RTP/AVP 0
c=IN IP4 131.160.1.112
a=rtpmap:0 PCMU/8000
m=message 49172 IMTP/TCP application/soap+xml
c=IN IP4 asb.operator.com a=direction:both
a=wsdl:http://schemas.operator.com/conferencecontrol-
.wsdl
a=wscafcontextidentifier:http://services.operator.com/ws-
caf/2004/09/wsctx/abcdef:012345
a=wscaftype:http://services.operator.com/wscaf/2004/09/
wsctx/context/mmservice 4. In the event of an existing transaction, its status is updated based on the processed message(s).
5. SOAP elements used for carrying session information are converted to SIP headers and vice versa.

Transactions already mapped to SIP sessions can avoid re-sending WS session-related information in the SOAP messages that was already negotiated during SIP session initiation. The following examples illustrate how based on an established SIP session (as described in step 3b) the information related to the WS-Context session for WS service invocation can be optimized through avoiding repetition of the WS-Context related information in the SOAP header.

a) An Example of service invocation specifying a WS-Context session:

```
<soap:Envelope
xmlns:soap="http://www.w3.org/2002/06/soap-envelope">
    <soap:Header>
        <context xmlns="http://docs.oasis-open.org/wscaf/2004/09/wsctx"
        timeout="100"
            xmlns:wsdl="http://schemas.xmlsoap.org/wsdl/"
            xmlns:soapbind=http://schemas.xmlsoap.org/wsdl/soap/
            soap:mustUnderstand="1">
            <context-identifier>
                http://services.operator.com/wscaf/2004/09/wsctx/abcdef:
                012345
            </context-identifier>
            <type>
                http://services.operator.com/wscaf/2004/09/wsctx/context/
                mmservice
            </type>
        </context>
    </soap:Header>
    <soap:Body>
        <!-- Application Payload
            MMService specific payload -->
    </soap:Body>
</soap:Envelope>
``` b) An example of optimized service invocation without explicit specification of a WS-Context session:

```
<soap:Envelope
xmlns:soap="http://www.w3.org/2002/06/soap-envelope">
    <soap:Header>
    </soap:Header>
    <soap:Body>
        <!-- Application Payload
            MMService specific payload -->
    </soap:Body>
</soap:Envelope>
```

6. The SIP messages thus generate are forwarded to IMS service B.

Before authentication based on a SOAP envelope as described in step 3 of the above algorithm can be applied, an agreement between the service consumer and the service provider has to be reached on how to provide required credentials. Such credentials can be exchanged using the following protocol:

1. The operator, as service provider, defines a format for the exchange of credentials including various types of data describing the application and authenticating the user (e.g. login name, password, application name, etc.). Such a format can be implemented by various means, e.g. by extending the WSDL description of the given service to include appropriate parameters, or to extend the header of the SOAP messages again with appropriate header parameters.
2. Applications seeking authentication need to implement an authentication scheme based on the schema provided by the operator as described in step 1.
   a. Credentials for authenticating subscribers of the operator are generated based on common secrets known to both the operator and the application (e.g. the id-system of the user, terminal data, etc.).
   b. Credentials for authenticating non-subscribers need to be agreed upon in advance. This can happen through registration in appropriate sites provided by the operator.

In the following, an embodiment of an authentication mechanism that can be used in combination with the above session mapping mechanism will be described. As input, the mechanism receives incoming invocation request messages from non-SIP applications running e.g. on terminals outside the IMS domain. The output will be the authentication status of the non-SIP applications.

1. Analyze the IP address of the incoming request
   a. Requests originating from addresses within the trusted domain (from the operator itself or from other trusted networks) are further processed in step 2.
   b. Requests originating from outside the trusted domain are further processed in step 4.
2. IF the IP address is the address of a known and trusted node that adds authentication credentials to the request (e.g. a WAP gateway)
   a. THEN IF embedded credentials are available (e.g. in the case of a WAP gateway check for special HTTP header inserted by the WAP-gateway)
      i THEN Analyse credentials (e.g. extract MSISDN number)
      ii ELSE goto step 3
   b. ELSE goto step 3
3. Analyze request (e.g. SOAP envelope) and check the availability of authentication credentials (e.g. inside SOAP header/body)
   a. IF credentials are available then remove authentication data required by the mapping device from the request in order to comply with the original service API. Proceed with further authentication based on this data in step 5.
      The following examples illustrate how the required credentials for establishing the IMS session are extracted from the incoming extended SOAP message thereby producing a non-extended SOAP message.

An example of SOAP request extended with authentication credentials is given below:

```
<soap:Envelope xmlns:soap=http://www.w3.org/2002/06/soap-envelope
    xmlns:auth = "http://liberty.org">
<soap:Header>
    <auth:credential1 name="user1"/>
    <auth:credential2:password="secret"/>
    </soap:Header>
    <soap:Body>
```

```
            <!-- Application Payload
                MMService specific payload -->
        </soap:Body>
</soap:Envelope>
```

An example of SOAP request without authentication credentials is given below:

```
<soap:Envelope
    xmlns:soap="http://www.w3.org/2002/06/soap-envelope">
        <soap:Header>
        </soap:Header>
        <soap:Body>
            <!-- Application Payload
                MMService specific payload -->
        </soap:Body>
</soap:Envelope>
``` b. ELSE goto step 4

4. Use address properties of the incoming packet (e.g. IP address, DNS address, MAC address, etc.) to implicitly determine the id-system of the user and create appropriate temporary credentials. It should be noted that this identification is not as precise and secure as the identification enabled through previous steps. The lack of precision can be attributed e.g. to lack of unique mapping between IP addresses and applications.

5. Convert credentials to IMS format, use them to authenticate the application

In the following, some embodiments of mapping devices 100 will be discussed in more detail.

Figure 4:
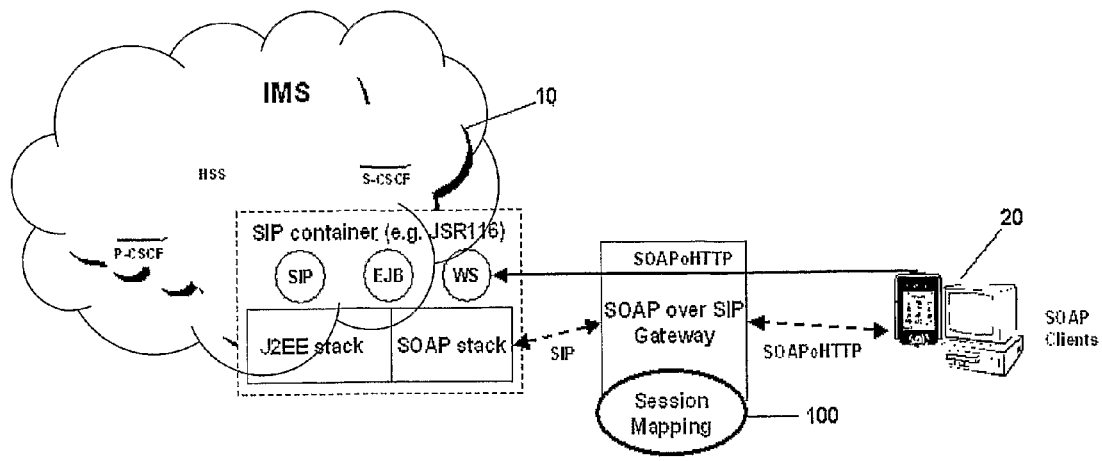
FIG. 4 illustrates an embodiment according to the present invention embodied as a SOAP over SIP gateway for accessing Web Services in the IMS domain.

According to one embodiment shown in FIG. 4, the mapping device 100 is implemented as a gateway node located between the IMS domain 10 and clients 20 situated in the non-IMS domain (e.g. SOAP clients 20 using Web Services). FIG. 4 illustrates a non-SIP to SIP run-time session mapping for accessing non-SIP operator-controlled services deployed inside the IMS domain 10.

The Service Description Protocol (SDP) can be used to describe different types of SIP services. Each SIP session initiation can contain an SDP description. One possibility therefore would be to define SDP descriptions for establishing sessions of a specific type as corresponding to specific non-IMS service invocations and session establishment/management technology. Session mapping/conversion can thus also be enabled by mapping certain fields of incoming service invocations to their corresponding fields in the SDP description. In this case specific types of non-IMS service invocations (e.g. CORBA services, J2EE services, Java RMI services, NET services and naturally pure SOAP Services) would be mapped to specific pre-defined SDP descriptions for these technologies.

The session mapping may be implemented using a table listing the currently ongoing sessions. In the table, each ongoing session may be associated with particular parameters that allow the mapping device 100, upon a receipt of a service layer message from the clients 20, to identify whether or not the message relates to an ongoing session within the IMS domain 10. In principle, an individual client 20 may be associated with the plurality of individual sessions involving one and the same service or different services within the IMS domain 10.

As shown in FIG. 4, a service invocation message is received by the mapping device 100 on a service layer (SOAP over HTTP) and recognized as invoking a service within the IMS domain 10. Then, on a session control layer ("SIP layer"), a protocol element conversion takes place within the mapping device 100 in context with providing an IMS control session ("SIP-controlled session") for the service to be invoked. The IMS control session is then used as vehicle for communication between the client 20 and the requested service within the IMS domain 20.

In the scenario of FIG. 4, the mapping device 100 is completely transparent to the invoking SOAP clients 20 (i.e., the clients 20 need not have any knowledge of the presence and function of the mapping device 100). This is advantageous because it allows usage by standard (non-modified) clients 20 in a non-IMS domain.

The mapping device 100 may also be implemented on the side of the non-IMS domain, e.g. within the client 20 by modifying the client protocol stacks (i.e. J2EE, WS SOAP stack, etc.). This is depicted in FIG. 5 using Web Services as an example.

Figure 5:
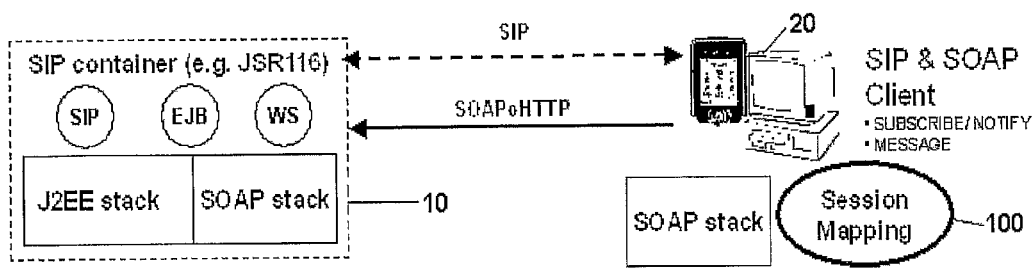
FIG. 5 illustrates an embodiment according to the present invention embodied as a design-time SOAP to SIP session mapping for accessing Web Services in the IMS domain.

FIG. 5 illustrates a non-SIP to SIP run-time session mapping for accessing non-SIP operator-controlled services deployed inside the IMS domain 10. In this scenario, the mapping device 100 is integrated in the client protocol stack of the client 20 in the non-IMS domain. This solution is particularly advantageous because it does not require the deployment of additional network nodes (e.g. of gateways as in the embodiment shown in FIG. 4).

Given the lack of widespread IMS enabled clients (e.g. user terminals such as mobile telephones) in the market, such a modified stack could be directly implemented in the first generation of such clients. This is an advantage as it eliminates update-related costs compared to typical deployment scenarios requiring existing clients to be updated with additional functionality.

Figure 6:
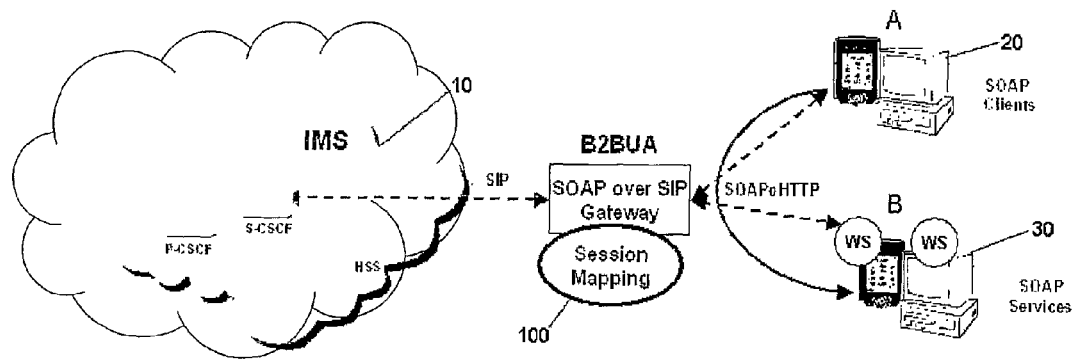
FIG. 6 illustrates an embodiment according to the present invention embodied as a SOAP over SIP mapping for transparently accessing IMS facilities for user/service management.

The implementation of the mapping device 100 as a gateway is usually used for transparent access to the operator-controlled services inside the IMS domain 10. A special use-case for the gateway-based solution could be the situation where two non-IMS components 20, 30 communicate with each other through such a gateway 100 to be able to utilize IMS services in the form of support functions provided by the IMS domain 10 (such as AAA, HSS, etc., using the DIAMETER protocol). This scenario is shown in FIG. 6 and is particularly interesting for third-party service-providers, as they consider the operator to be a reliable and trustworthy mediator. The operator, in turn, may also benefit as it can charge for providing this functionality.

The scenario shown in FIG. 6 may require that a service provider 30 in a non-IMS domain has an appropriate business agreement with the IMS operator and has deployed his service in a way that it is registered and accessible via the mapping device gateway 100. Alternatively, a client 20 in a non-IMS domain may also be registered with the operator. This allows the client 20 to take advantage of operator-provided SIP authentication and authorization mechanisms to identify itself towards the third-party service provider 30.

Figure 7:
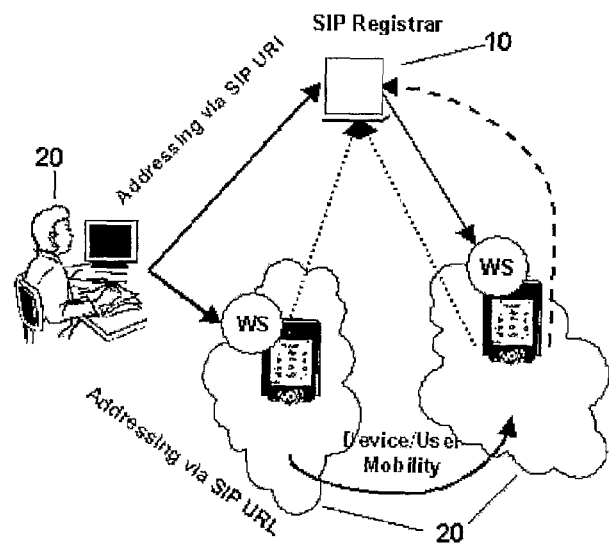
FIG. 7 illustrates an embodiment according to the invention using SIP URIs to implement addressing of mobile services.

With reference to FIG. 7, an embodiment of a SIP-based uniform addressing and service invocation scheme that can be used in combination with the above embodiments will be described.

Instead of using the HTTP (HyperText Transfer Protocol) URL, the logical SIP URIs (and eventually SIP URLs) are used for the uniform addressing scheme and for mobile service invocations. The access to the service via URI allows for service mobility by providing a transparent access to the service regardless of its current URL. This allows for addressing of IMS services deployed on mobile devices not having a fixed attachment to the network and consequently not having a fixed URL.

The scenario shown in FIG. 7 involves two major steps, namely
 a. defining the use of a SIP URI for dynamic invocation of mobile IMS services regardless of their current URL. (Possibly by defining an extension for WS-Addressing.)
 b. defining the fixed addressing of services using a SIP URL As has been shown in the above embodiments, the interoperability between the IMS and any other domain can be increased by establishing a mapping between a WS session/service and (one or multiple) SIP sessions. In this context, the SOAP elements used for carrying the session information can be converted into SIP headers and vice versa. Re-sending of the WS session-related information in the SOAP messages inside IMS/SIP networks can be avoided if the SIP session has already been provided with it.

The techniques can be performed by a SIP-to-non-SIP (e.g. SIP-SOAP) gateway that transparently maps between e.g. non-SIP services and SIP sessions and can be used without adaptation of the client application. Alternatively, the techniques are performed in the above embodiments by extending the WS stack/SIP stack to enhance applications allowing them to transparently map between WS sessions and SIP sessions without additional infrastructure components in the network.

Thus, the embodiments provide WS invocation within an IMS domain or network. They allow the use of existing, more efficient SIP-based session management mechanisms for WS session management and provide a better interoperability and integration between the IMS system and infrastructure and the Web Services deployed inside the IMS domain. Furthermore, the embodiments make it possible to use standard IMS mechanisms for AAA, charging, etc also for invocations and control of services such as Web Services outside IMS domain. In so doing, the embodiments allow for a seamless integration of Web Services into IMS systems. Developers do not need to explicitly support the IMS/SIP protocols and APIs. All this may be done transparently or by the extensions of WS and/or SIP stacks.

Furthermore, the embodiments enable a reduction in the amount of traffic required for transmission of session information by e.g. Web Services inside IMS networks. The embodiments also provide Web Services with mobility by allowing invocation using its URI that may be different from its URL. This allows the service to change its execution platform (and therefore its URL) while still being addressable under the same URI. In this regard, the routing of service invocation calls may be handled by a SIP registry (i.e. a CSCF node in the IMS domain) that is aware of the current position of every user and redirects service invocation calls using the SIP URI to the currently correct SIP URL.

It should be noted that the approaches set forth above can be used not only for mapping of Web Services sessions to SIP sessions. In principle, the invention can be used for mapping of any external Remote Procedure Call (RPC) protocol having the concept of sessions to any IMS internal protocol suitable for the required needs. These may include, for example, CORBA, Java RMI, and other proprietary protocols.

While the present invention has been described with respect to particular embodiments, those skilled in the art will recognize that the present invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. In a telecommunications network, a method of providing interoperability between an Internet protocol multimedia subsystem (IMS) domain and a non-IMS domain, comprising the steps of:
 receiving on a service layer a service invocation message from the non-IMS domain;
 analyzing the message to identify the message as a request to invoke a service within the IMS domain;
 identifying whether or not the message relates to an ongoing session within the IMS domain by using a table listing currently ongoing sessions;
 converting, on a session control layer, non-IMS session control protocol elements related to the message into IMS session control related protocol elements;
 sending one or more messages towards the IMS domain to provide an IMS control session in the IMS domain based on the MS session control related protocol elements; and
 forwarding on the service layer the service invocation message using the IMS control session.

2. The method of claim 1, further comprising the steps of:
 receiving a further message from the non-IMS domain related to the service invoked within the IMS domain; and
 forwarding on the service layer he service message using the IMS control session.

3. The method of claim 1, further comprising the steps of:
 receiving a message from the IMS domain during the session;
 converting IMS session control protocol elements related to the message from the IMS domain into non-IMS session control protocol elements;
 generating a non-IMS message based on the non-IMS session control protocol elements; and
 sending the non-IMS message to the non-IMS domain.

4. The method of claim 3, wherein the non-IMS message is sent to the non-IMS domain during the session.

5. The method of claim 1, wherein the service in the IMS domain is an IMS support function including authentication, authorization, accounting, charging, access control, or HSS.

6. The method of claim 1, wherein the service in the IMS domain is a non-IMS protocol based application.

7. The method of claim 1, wherein the IMS session control protocol elements comprise session initiation protocol (SIP) headers and the non-IMS session control protocol elements comprise non-SIP headers.

8. The method of claim 1, wherein the non-IMS domain employs a protocol for exchanging Markup Language (ML) based messages.

9. The method of claim 1, comprising the steps of:
 analyzing the message received from the non-IMS domain or from the IMS domain;
 determining a state of the session with the service in the IMS domain based on the analyzed message; and
 storing the state of the session.

10. The method of claim 1, comprising the steps of:
 checking whether a session with the service in the IMS domain is ongoing; and
 if there is no ongoing session, initializing a new session under the IMS session control protocol.

11. The method of claim 1, further comprising the step of associating a service requestor with one or more requested or ongoing sessions inside the IMS domain.

12. The method of claim 11, wherein the service requestor is an application or a network component outside the IMS domain.

13. The method of claim 1, comprising the step o:
authenticating the non-IMS message prior to establishing the control session in the IMS domain.

14. The method of claim 13, wherein the step of authenticating the non-IMS message comprises analyzing an address specified in the message.

15. The method of claim 1, comprising the step of
employing a uniform addressing scheme using SIP addressing for the invocation of fixed and/or mobile services.

16. The method of claim 1, wherein the service to be invoked resides on a mobile platform inside the IMS domain, the method comprising the step of
defining a SIP unique resource identifier (URI) for dynamic invocation of the service in the IMS domain, regardless of a current unique resource locator (URL) for the mobile platform.

17. The method of claim 1, comprising the step of
defining a SIP unique resource locator (URL) for fixed addressing of the service in the IMS domain.

18. A mapping device for providing interoperability between a session initiation protocol (IMS) domain and a non-IMS domain, comprising:
an analyzing unit to analyze incoming service invocation messages received on a service layer from the non-IMS domain, to identify whether one of the service invocation messages is an invocation of a service within the IMS domain;
logic circuitry to identify whether or not the message relates to an ongoing session within the IMS domain by using a table listing currently ongoing sessions;
a conversion unit to convert on a session control layer non-IMS session control protocol elements related to one of the messages into IMS session control related protocol elements; and
a messaging unit to generate one or more messages to provide an IMS control session in the IMS domain based on the IMS session control related protocol elements;
wherein the device is adapted to forward on the service layer the service invocation message using the IMS control session.

19. The mapping device of claim 18, wherein the device is implemented as a gateway between the IMS domain and the non-IMS domain.

20. The mapping device of claim 19, wherein the device is integrated in a protocol stack of a network component in the non-IMS domain.

21. A user terminal comprising a mapping device for providing interoperability between a session initiation protocol (IMS) domain and a non-IMS domain, the mapping device comprising:
an analyzing unit to analyze incoming service invocation messages received on a service layer from the non-IMS domain, to identify whether one of the service invocation messages is an invocation of a service within the IMS domain;
logic circuitry to identify whether or not the message relates to an ongoing session within the IMS domain by using a table listing currently ongoing sessions;
a conversion unit to convert on a session control layer non-IMS session control protocol elements related to one of the messages into IMS session control related protocol elements; and
a messaging unit to generate one or more messages to provide an IMS control session in the IMS domain based on the IMS session control related protocol elements;
wherein the device is adapted to forward on the service layer the service invocation message using the IMS control session.

22. The user terminal of claim 21, wherein the mapping device is implemented as a gateway between the IMS domain and the non-IMS domain.

23. The user terminal of claim 21, wherein the mapping device is integrated in a protocol stack of a network component in the non-IMS domain.

\* \* \* \* \*

UNITED STATES PATENT AND TRADEMARK OFFICE
CERTIFICATE OF CORRECTION

PATENT NO.      : 9,531,817 B2
APPLICATION NO. : 12/158015
DATED           : December 27, 2016
INVENTOR(S)     : Levenshteyn et al.

It is certified that error appears in the above-identified patent and that said Letters Patent is hereby corrected as shown below:

On the Title Page

Item (56), under "U.S. PATENT DOCUMENTS", in Column 2, Line 6, delete "Aaronos et al." and insert -- Aarnos et al. --, therefor.

Item (56), under "OTHER PUBLICATIONS", in Column 2, Line 2, delete "for Next" and insert -- for --, therefor.

Item (56), under "OTHER PUBLICATIONS", in Column 2, Line 4, delete "2004." and insert -- 2005. --, therefor.

Item (56), under "OTHER PUBLICATIONS", in Column 2, Line 5, delete "Converence" and insert -- Conference --, therefor.

Item (57), under "ABSTRACT", in Column 2, Line 8, delete "non-IMS session control" and insert -- non-IMS control session --, therefor throughout the Patent.

Item (57), under "ABSTRACT", in Column 2, Line 9, delete "IMS session control" and insert -- IMS control session --, therefor throughout the Patent.

On Page 2, in Item (56), under "OTHER PUBLICATIONS", in Column 1, Line 2, delete "(OSA):" and insert -- (OSA); --, therefor.

On Page 2, in Item (56), under "OTHER PUBLICATIONS", in Column 1, Line 4, delete "Sophia-Antipo," and insert -- Sophia-Antipolis, --, therefor.

On Page 2, in Item (56), under "OTHER PUBLICATIONS", in Column 1, Line 10, delete "Sophia-Antipo," and insert -- Sophia-Antipolis, --, therefor.

Signed and Sealed this
Thirtieth Day of January, 2018

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,531,817 B2

On Page 2, in Item (56), under "OTHER PUBLICATIONS", in Column 1, Line 12, delete "Technology," and insert -- Technical Journal, --, therefor.

On Page 2, in Item (56), under "OTHER PUBLICATIONS", in Column 1, Line 13, delete "Murrey Hill, NJ, US, vol. 2. No. 7," and insert -- Murray Hill, NJ, US, vol. 7. No. 2, --, therefor.

On Page 2, in Item (56), under "OTHER PUBLICATIONS", in Column 1, Line 16, delete "J.," and insert -- J. et al., --, therefor.

In the Specification

In Column 2, Line 23, delete "CSCF-I and the CSCF-P," and insert -- I-CSCF and the P-CSCF, --, therefor.

In Column 2, Line 27, delete "NET," and insert -- .NET, --, therefor.

In Column 2, Line 45, delete "(unique" and insert -- (uniform --, therefor.

In Column 4, Line 23, delete "unique" and insert -- uniform --, therefor.

In Column 4, Line 25, delete "unique" and insert -- uniform --, therefor.

In Column 4, Line 40, delete "method is" and insert -- method --, therefor.

In Column 4, Line 62, delete "ore" and insert -- or --, therefor.

In Column 6, Line 2, delete "domain)" and insert -- domain). --, therefor.

In Column 7, Line 28, delete "publishes" and insert -- publish --, therefor.

In Column 9, Line 60, delete "generate" and insert -- generated --, therefor.

In Column 11, Line 52, delete "NET" and insert -- .NET --, therefor.

In Column 12, Line 7, delete "IMS domain 20." and insert -- IMS domain 10. --, therefor.

In the Claims

In Column 14, Line 24, in Claim 1, delete "MS" and insert -- IMS --, therefor.

In Column 14, Line 32, in Claim 2, delete "he" and insert -- the --, therefor.

In Column 15, Line 7, in Claim 13, delete "o:" and insert -- of: --, therefor.

In Column 15, Line 13, in Claim 15, delete "of" and insert -- of: --, therefor.

CERTIFICATE OF CORRECTION (continued)
U.S. Pat. No. 9,531,817 B2

In Column 15, Line 20, in Claim 16, delete "of" and insert -- of: --, therefor.

In Column 15, Line 21, in Claim 16, delete "unique" and insert -- uniform --, therefor.

In Column 15, Line 23, in Claim 16, delete "unique" and insert -- uniform --, therefor.

In Column 15, Line 25, in Claim 17, delete "of" and insert -- of: --, therefor.

In Column 15, Line 26, in Claim 17, delete "unique" and insert -- uniform --, therefor.

In Column 15, Line 29, in Claim 18, delete "session initiation protocol (IMS)" and insert -- Internet Protocol Multimedia Subsystem (IMS) --, therefor.

In Column 16, Lines 14-15, in Claim 21, delete "session initiation protocol (IMS)" and insert -- Internet Protocol Multimedia Subsystem (IMS) --, therefor.